Nov. 27, 1951  E. BRICHARD ET AL  2,576,564
CUTTER TOOL CONTROL FOR GLASS CUTTING MACHINES
Filed Dec. 19, 1945
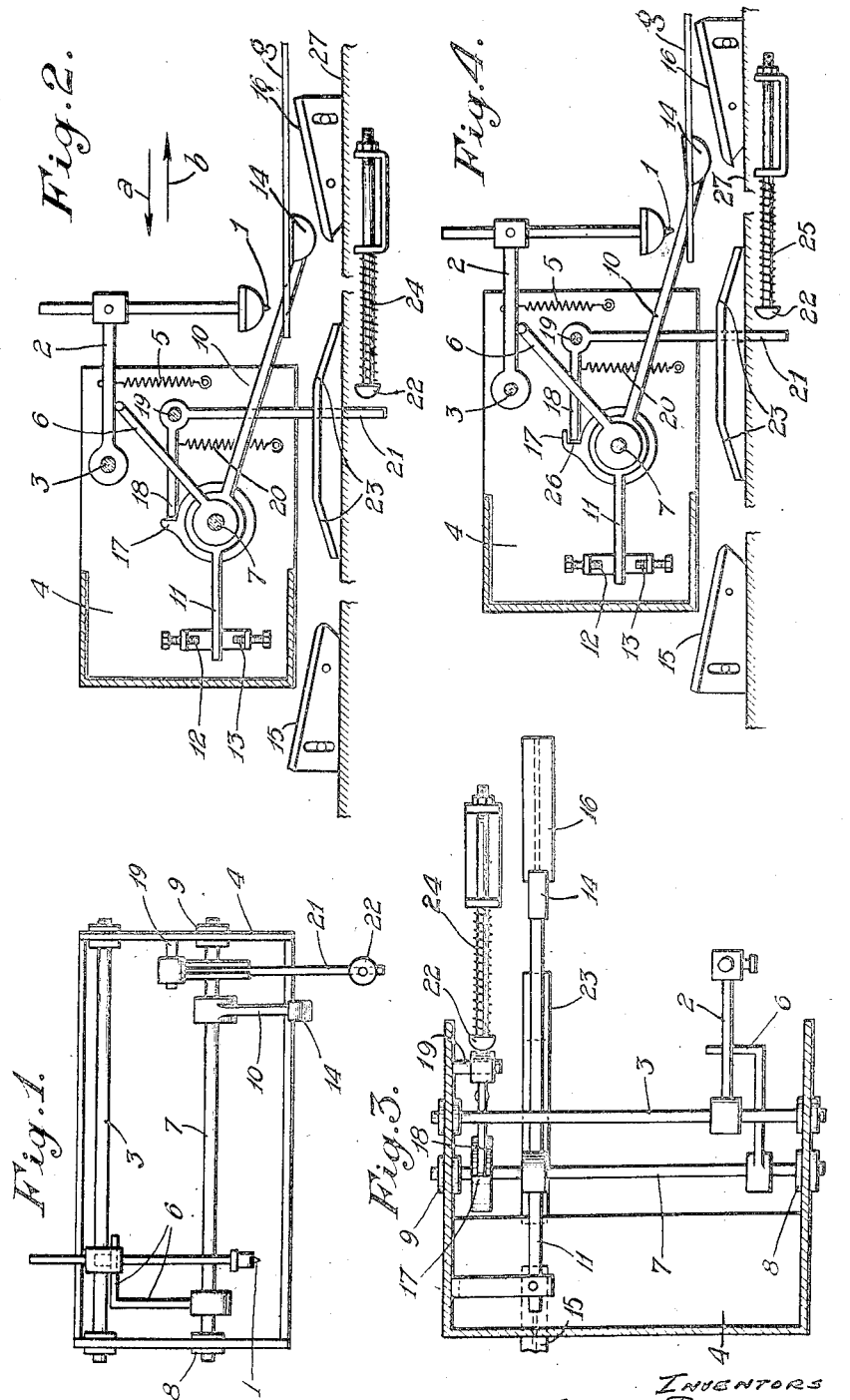

Patented Nov. 27, 1951

2,576,564

UNITED STATES PATENT OFFICE 2,576,564

CUTTER TOOL CONTROL FOR GLASS CUTTING MACHINES

Edgard Brichard, Jumet, Marc Delacuvellerie, Loverval, and Pierre Malicheff, Couillet, Belgium, assignors to Union Des Verreries Mecaniques Belges, S. A., Charleroi, Belgium, a Belgian company Application December 19, 1945, Serial No. 635,960
In Belgium January 4, 1945

12 Claims. (Cl. 33—32)

This invention relates to means for controlling the operation of the cutter tools in machines for cutting glass sheets. These tools which usually consist of cut diamonds or hard steel discs having a sharp circumferential edge, glide or revolve on the surface of the glass on which they bear with sufficient force to mark therein a so called "cutting line" along which it is subsequently severed.

It is essential that during its return stroke the cutter shall not again run over the cutting line formed during its operative stroke, lest the sharpness of such line or the tool itself be impaired.

On the other hand contact of the cutter with the glass should be smooth, as any shock is liable to deteriorate the cutter edge. Moreover, if the cutter falls heavily on the glass, it rebounds, the cutting line becomes irregular, vibrations induced in the tool carrier are transmitted to the cutter and the latter marks on the glass a cutting line that is "modulated" i. e. of varying depth and consequently inefficient. For the same reason it is important carefully to avoid any cause for vibration of the cutter.

It is also necessary that the cutter may be temporarily put out of operation to avoid its coming into contact with foreign bodies or with defects or irregularities in the glass whereby it could be deteriorated.

It is known to realise the progressive drop of the cutter by causing a gliding member rigidly connected therewith to ride down a ramp at a suitable angle and using a latch pivoted on the tool carrier in order to lock the cutter during its return stroke, but so far as we are aware, known devices of the kind have neither sufficient resiliency nor sufficient reliability to answer the various conditions above set forth.

The object of the present invention is to fulfill these conditions. To that end we also use ramps to control the lifting of the cutter and a latch to hold the cutter in the raised position, but instead of being mounted on the tool carrier, in accordance with this invention the latch is mounted independently so that its reactions cannot interfere with the movements of the cutter. Furthermore, instead of being rigid with the member riding on the lifting ramps, the tool carrier rests freely on a part rigid with said member, so that it is capable, according to requirements, of being accelerated in its upward movement and slowed down in its downward movement. Tool carrier, lifting member and latch are carried by the same support and pivotally mounted thereon independently of each other, such support being stationary or movable according as the glass sheet moves or not during the cutting operation.

Two constructional forms of the mechanism according to this invention are illustrated by way of example in the accompanying drawing in which:

Fig. 1 is a front elevation of a mechanism embodying our invention.

Fig. 2 is a side elevation of this mechanism and Fig. 3 is a plane view of the same.

Fig. 4 shows a slightly modified form in side elevation.

In the example shown in Figs. 1 to 3, the cutter 1 is secured to a tool carrier arm 2 pivoted on a shaft 3 secured to a movable support 4 which has a reciprocating motion parallel to the surface of the glass sheet (not shown but herein supposed to be horizontal). The support 4 may have any suitable form, as that of a carriage having a rectilinear motion parallel to the glass sheet if the latter is to be cut into panes.

Normally the cutter 1 rests on the glass sheet $g$ either by gravity or under the action of a spring. It can be lifted and put out of operation by a crank shaped rod 6 fastened on a shaft 7 adapted to swing freely in two bearings 8, 9 fixed to the support 4. On the shaft 7 are secured a lever 10 for controlling the swinging movements of said shaft and an arm 11 for limiting its angle of motion between two stops 12, 13 adjustably mounted on the support 4.

The end of the lever 10 carries a shoe 14 which meets a ramp 15 at the end of the operative stroke of the movable support 4 (in the direction of arrow $a$, Fig. 2) and meets a ramp 16 at the end of the return stroke (in the direction of arrow $b$). The angle of said ramps is adjustable according to the cutting speed, in order that the speed of the upward movement of the cutter and the speed of its downward movement towards the glass shall be sufficiently low. Their position is so adjusted that the cutter shall be in raised position at both ends of its active stroke.

It is furthermore necessary that the cutter shall remain in contact with the glass over the whole length of its operative stroke and that it shall stay raised during the entire return stroke. For this purpose the shaft 7 is provided with a projection 17 which is engaged by a latch 18 when the lever 10 riding up the ramp 15 has raised the cutter on the latter reaching the end of its operative stroke.

The latch 18 is pivotally mounted on a pin 19 secured to the support 4 and it is permanently urged downwardly by a spring 20 or by gravity so that it is unable to get spontaneously disengaged, but tends to engage the projection 17 as soon as the latter stands in front of it.

The cutter thus accomplishes its return stroke in direction of arrow $b$ until it is in line with the ramp 16. At this moment, whereas the shoe 14 is above the ramp 16 without coming into contact therewith, the heel portion 21 of latch 18 abuts against a stop 22 which causes the latch to swing about its axis 19 and to disengage the projection 17. The shaft 7 then is free to swing until the shoe 14 contacts the ramp 16 and rides up said ramp to the end of the return stroke of the cutter.

The relative positions of ramp 16 and stop 22 are so determined that the downward movement of the cutter 1 accompanying the drop of the shoe 14 onto the ramp, does not bring the cutter into contact with the glass. The vibrations which may have been generated in the tool carrier by this drop are dampened during the end of the stroke.

As the support 4 moves in the reverse direction for the operative stroke of the cutter, the shoe 14 rides down the ramp 16 and at the same time the latch 18 swings on its axis 19 towards the projection 17. It does not catch the projection, however, as when it will have moved near enough to do so, the projection 17 has moved beyond its engaging position and the latch 18 will pass above the projection. The shaft 17 thus can swing freely as far as permitted by the stop 12 and the cutter 1 comes to rest on the glass which it will scratch over the whole length of its operative stroke.

At the end of this stroke, the shoe 14 is raised by the ramp 15 and the rod 6 lifts the cutter which then is held in raised position by the engagement of the projection 17 with the latch 18.

If in order to avoid the cutter contacting with a defect in the glass or for any other reason it is desired to render the cutter inoperative over a part of its operative stroke, it suffices to place at the corresponding place in the path of the shoe 14 a ramp with a double incline as 23 of sufficient height to cause the cutter to leave the surface of the glass, though not high enough to bring the tip of latch 18 into engagement with the projection 17. Thus the cutters in their operative stroke will not cut the portion of the sheet which corresponds in position and size with the ramp 23. In the return stroke, the shoe 14 passes over the ramp 23 without contacting same, since the latch 18 and the projection 17 then are engaged.

In the example shown in Figs. 1 to 3 the stop 22 is carried by a screw 24 whereby its position can be adjusted with respect to the ramp 16. We may also, as illustrated in Fig. 4, mount the stop 22 on a spring 25 whose action on the latch 18 then should be more powerful than that of the biassing spring 20. In this form of construction there is also provided in the projection 17 a notch 26 into which the tip of latch 18 engages and wherefrom it can be disengaged only after an angular movement of shaft 7 caused by the upward movement of shoe 14 along ramp 16.

Under these conditions, when at the end of the return stroke the heel 21 of latch 18 comes into contact with stop 22, the said stop is forced back, compressing spring 25 until the moment when, the shoe 14 reaching ramp 16, the shaft 7 swings, the projection 17 moves away and disengages the latch 18 which escapes while the stop 22 is urged forwardly by the pressure of spring 25 as it expands.

During the next operative stroke, the shoe 14 rides down the ramp 16, allowing the tool to move gradually towards the glass sheet. The latch 18 cannot engage the notch in projection 17 as, at the moment the shoe 14 passes the place where its disengagement took place in the preceding stroke, the latch will be away from its engaging position in the notch by a distance corresponding to the expansion of the spring 25 at the moment of the previous disengagement, which expansion may be varied as desired by adjusting the relative position of stop 22 and ramp 16.

The cutter thus will scratch the glass as it performs its operative stroke and it will be lifted at the end of the stroke as above described. The operation of the mechanism thus place under most satisfactory conditions, without any shock being imparted to the tool carrier.

While only one cutter has been mentioned until now, it is obvious that the operation will be the same when the shaft 3 carries two or any number of cutters adapted simultaneously to mark a series of parallel lines, as these cutters may either be lifted together by a controlling member such as 6, or lifted individually by as many members 6 as there are cutters 1.

Constructional modifications may also be made in the mechanism described without departing from the scope of our invention. Thus, in the apparatus shown, the shaft 3 on which the tool carrying arm 2 is pivoted is separate from the shaft 7 carrying the lifting rod 6. The tool carrier may of course be pivoted on shaft 7, shaft 3 then being omitted, without affecting the operation of the mechanism.

It will also be understood that it is indifferent whether the support 4 is movable with respect to the glass sheet and the frame 27 supporting said sheet and carrying the ramps 15, 16 and 23, or whether the said frame is movable and the support 4 is stationary.

We claim:

1. In a mechanism for controlling the cutter in a glass cutting machine, the combination of a frame, a reciprocating support movable along said frame, a shaft pivotally mounted on said support, an upward arm and a downward arm secured to said shaft, a shoe at the end of said downward arm, end ramps on said frame co-operating with said shoe to control the vertical movements of said arms, said upward arm having a lateral extension, a cutter carrier pivoted to said support, said cutter carrier resting on said extension, a latch for holding said arms in raised position, means operatively connected to said shaft and extending therefrom into engagement with the said latch, said latch being pivoted to said support, a yielding abutment on said frame for operating said latch to allow said upward and downward arms to drop, and a stop on said support for limiting the drop of said arms, said end ramp being sufficiently high to bring said means into engagement with said latch, and at least an intermediate ramp for momentarily lifting said means, said ramp being too low to bring said means into engagement with said latch.

2. In a mechanism for controlling the cutter in a glass cutting machine, the combination of a support, an oscillating shaft pivotally mounted on said support, a crank rod, a notched projection and a shoe rigidly connected with said shaft, a cutter carrier pivoted to said support and resting freely on said crank rod, a frame, said support and said frame being capable of reciprocating motion relatively to each other, a first ramp on said frame adapted to engage said shoe at the end of the return stroke of the support, a second ramp on said frame adapted to engage said shoe at the end of the working stroke of the support, to rotate said shaft and raise and lower said crank rod, a spring actuated latch arranged on said support and adapted to co-operate with the notch of said projection to hold said crank in raised position, a heel portion of said latch, and a spring actuated stop adjustable on said frame and adapted to co-operate with said heel portion at the end of the return stroke, the spring of said stop being stronger than the spring of said latch, said spring actuated stop, said first mentioned ramp, said heel portion of the latch and said shoe being so arranged with respect to each other that during the end of the return stroke said heel portion enters into engagement with said spring actuated stop when the shoe is still at a distance from said first mentioned ramp, and that the shoe engages this latter ramp and rises upon it when the spring of said stop has been compressed by said heel portion of the latch for causing the shoe to disengage the notched projection from said latch, thereby enabling the spring actuated stop to move the latch out of the way of said notched projection, the second mentioned ramp being adapted to lift the shoe and bring the latch into engagement with said projection.

3. In a mechanism for controlling the cutter in a glass cutting machine, the combination of a support, an oscillating shaft pivotally mounted on said support, a crank rod, a projection and a shoe each rigidly connected with said shaft, a cutter carrier pivoted to said support and resting freely on said crank rod, a frame, said support and said frame being capable of reciprocating motion relatively to each other, a first ramp on said frame adapted to engage said shoe at the end of the return stroke of the support, a second ramp on said frame adapted to engage said shoe at the end of the working stroke of the support, to rotate said shaft and raise and lower said crank rod, a spring actuated latch arranged on said support and adapted to cooperate with said projection to hold said crank in raised position, a heel portion on said latch, and a spring actuated stop adjustable on said frame and adapted to be depressed by said heel portion at the end of the return stroke, the spring of said stop being stronger than the spring of said latch, said spring actuated stop, said first mentioned ramp, said heel portion of the latch and said shoe being so arranged with respect to each other, that, during the end of the return stroke, said heel portion enters into engagement with said spring actuated stop when the shoe is still at a distance from the point on the first mentioned ramp at which the shoe enters into contact with said ramp, and that the shoe engages said ramp, rises upon it and disengages said projection from said latch when the spring of said stop has been compressed by the heel portion of the latch, thereby enabling the spring actuated stop to move the latch out of the way of said projection, the second mentioned ramp being adapted to lift the shoe and bring the latch into engagement with said projection.

4. In a mechanism for controlling the cutter in a glass cutting machine, the combination of a support, an oscillating shaft pivotally mounted on said support, a crank rod, a notched projection and a shoe rigidly connected with said shaft, a cutter carrier pivoted to said support and resting freely on said crank rod, a frame, said support and said frame being capable of reciprocating motion relatively to each other, a first ramp on said frame adapted to engage said shoe at the end of the return stroke of the support, a second ramp on said frame adapted to engage said shoe at the end of the working stroke of the support, to rotate said shaft and raise and lower said crank rod, a latch rotatably mounted on said support, a spring for holding said latch in engagement with said projection, a heel on said latch, said latch being retained during the return stroke within the notch of said projection, thereby preventing the latter from rotating in one direction, the entering of the latch into said notch and its disengagement therefrom being controlled by an angular displacement of said notched projection, and a spring actuated stop adjustable on said frame and adapted to be depressed by said heel portion of the latch and to disengage the latch from the projection when the shoe has risen on said first mentioned ramp and has thereby brought the notch out of engagement with said latch.

5. In a mechanism for controlling the cutter in a glass cutting machine, the combination of a support, an oscillating shaft pivotally mounted on said support, a crank rod, a notched projection and a shoe rigidly connected with said shaft, a cutter carrier pivoted to said support and resting freely on said crank rod, a frame, said support and said frame being capable of reciprocating motion relatively to each other, a first ramp on said frame adapted to engage said shoe at the end of the return stroke of the support, a second ramp on said frame adapted to engage said shoe at the end of the working stroke of the support, to rotate said shaft and raise and lower said crank rod, a latch rotatably mounted on said support, a spring for holding said latch in engagement with said projection, a heel on said latch, said latch being retained during the return stroke within the notch of said projection, thereby preventing the latter from rotating in one direction, the entering of the latch into said notch and its disengagement therefrom being controlled by an angular displacement of said notched projection, a spring actuated stop adjustable on said frame, the spring of this stop being stronger than the spring of the latch and adapted to move the latch out of the way of said projection, the heel of the latch being adapted to engage at the end of the return stroke said spring actuated stop, the first mentioned ramp occupying a position causing said shoe to engage this ramp only after said heel of the latch has started to depress the spring of the stop, both ramps being adapted to raise the shoe to a height which is sufficient for enabling said latch to enter into and out of engagement with the notch in said projection.

6. In a mechanism for controlling the cutter in a glass cutting machine, the combination of a support, an oscillating shaft pivotally mounted on said support, a crank rod, a projection and a shoe rigidly connected with said shaft, a cutter carrier pivoted to said support and resting freely on said crank rod, a frame, said support and said frame being capable of reciprocating motion relatively to each other, a first ramp on said frame adapted to engage said shoe at the end of the return stroke of the support, a second ramp on said frame adapted to engage said shoe at the end of the working stroke of the support, to rotate said shaft and raise and lower said crank rod, a latch rotatably mounted on said support, a spring for holding said latch in engagement with said projection, a heel on said latch, said latch being retained during the return stroke in engagement with said projection, thereby preventing the latter from rotating in one direction, the engagement of the latch with said projection and its disengagement therefrom being controlled by an angular displacement of said projection, and a spring actuated stop adjustable on said frame and adapted to be depressed by said heel portion of the latch and to disengage the latch from the projection when the shoe has risen on said first mentioned ramp.

7. In a mechanism for controlling the cutter in a glass cutting machine, the combination of a support, an oscillating shaft pivotally mounted on said support, a crank rod, a projection and a shoe rigidly connected with said shaft, a cutter carrier pivoted to said support and resting freely on said crank rod, a frame, said support and said frame being capable of reciprocating motion relatively to each other, a first ramp on said frame adapted to engage said shoe at the end of the return stroke of the support, a second ramp on said frame adapted to engage said shoe at the end of the working stroke of the support, to rotate said shaft and raise and lower said crank rod, a latch rotatably mounted on said support, a spring for holding said latch in engagement with said projection, a heel on said latch, said latch being retained during the return stroke in engagement with said projection, thereby preventing the latter from rotating in one direction, the engagement of the latch with said projection and its disengagement therefrom being controlled by an angular displacement of said projection, a spring actuated stop adjustable on said frame, the spring of this stop being stronger than the spring of the latch and adapted to move the latch out of the way of said projection, the heel of the latch being adapted to engage at the end of the return stroke said spring actuated stop, the first mentioned ramp occupying a position causing said shoe to engage this ramp only after said heel of the latch has started to depress the spring of the stop, both ramps being adapted to raise the shoe to a height which is sufficient for enabling said latch to enter into and out of engagement with said projection.

8. In a mechanism for controlling the cutter in a glass cutting machine, the combination of a support, an oscillating shaft pivotally mounted on said support, a notched projection and a shoe rigidly connected with said shaft, a cutter carrier also pivotally mounted on said support, a frame, said support and said frame being capable of reciprocating motion relatively to each other, a first ramp on said frame adapted to engage said shoe at the end of the return stroke of the support, a second ramp on said frame adapted to engage said shoe at the end of the working stroke of the support, to rotate said shaft, a spring actuated latch arranged on said support and adapted to co-operate with the notch of said projection, a heel portion on said latch, and a spring actuated stop adjustable on said frame and adapted to cooperate with said heel portion at the end of the return stroke, the spring of said stop being stronger than the spring of said latch, said spring actuated stop, said first mentioned ramp, said heel portion of the latch and said shoe being so arranged with respect to each other that during the end of the return stroke said heel portion enters into engagement with said spring actuated stop when the shoe is still at a distance from said first mentioned ramp, and that the shoe engages this latter ramp and rises upon it when the spring of said stop has been compressed by said heel portion of the latch for causing the shoe to disengage the notched projection from said latch, thereby enabling the spring actuated stop to move the latch out of the way of said notched projection, the second mentioned ramp being adapted to lift the shoe and bring the latch into engagement with said projection.

9. In a mechanism for controlling the cutter in a glass cutting machine, the combination of a support, an oscillating shaft pivotally mounted on said support, a projection and a shoe each rigidly connected with said shaft, a cutter carrier also pivotally mounted on said support, a frame, said support and said frame being capable of reciprocating motion relatively to each other, a first ramp on said frame adapted to engage said shoe at the end of the return stroke of the support, a second ramp on said frame adapted to engage said shoe at the end of the working stroke of the support, to rotate said shaft, a spring actuated latch arranged on said support and adapted to cooperate with said projection, a heel portion on said latch, and a spring actuated stop adjustable on said frame and adapted to be depressed by said heel portion at the end of the return stroke, the spring of said stop being stronger than the spring of said latch, said spring actuated stop, said first mentioned ramp, said heel portion of the latch and said shoe being so arranged with respect to each other, that, during the end of the return stroke, said heel portion enters into engagement with said spring actuated stop when the shoe is still at a distance from the point on the first mentioned ramp at which the shoe enters into contact with said ramp, and that the shoe engages said ramp, rises upon it and disengages said projection from said latch when the spring of said stop has been compressed by the heel portion of the latch, thereby enabling the spring actuated stop to move the latch out of the way of said projection, the second mentioned ramp being adapted to lift the shoe and bring the latch into engagement with said projection.

10. In a mechanism for controlling the cutter in a glass cutting machine, the combination of a support, an oscillating shaft pivotally mounted on said support, a crank rod, a projection and a shoe each rigidly connected with said shaft, a cutter carrier pivoted to said support and resting freely on said crank rod, a frame, said support and said frame being capable of reciprocating motion relatively to each other, ramps on said frame cooperating with said shoe to rotate said shaft and raise said crank rod, a latch cooperating with said projection to hold said crank in raised position, said latch having a depending heel portion, and an adjustable stop on said frame cooperating with said heel portion to move said latch away from said projection, said projection having a notch for engaging the tip of said latch, a spring being interposed between said stop and said frame to allow said stop to move back a distance at least equal to that through which said shoe slides on the ramp cooperating with said shoe at the end of the return stroke of the support for disengaging said notched projection from the tip of the latch.

11. In a mechanism for controlling the cutter in a glass cutting machine, the combination of a support, an oscillating shaft pivotally mounted on said support, a crank rod, a projection and a shoe each rigidly connected with said shaft, a cutter carrier pivoted to said support and resting freely on said crank rod, a frame, said support and said frame being capable of reciprocating motion relatively to each other, ramps on said frame cooperating with said shoe to rotate said shaft and raise said crank rod, a latch cooperating with said projection to hold said crank in raised position, said latch having a depending heel portion, and an adjustable stop on said frame cooperating with said heel portion to move said latch away from said projection, a spring being interposed between said stop and said frame to allow said stop to move back a distance and to move the latch out of the way of said projection when said shoe is in contact with and rising on the ramp cooperating with said shoe at the end of the return stroke of the support and causes the disengagement of said projection from said latch.

12. In a mechanism for controlling the cutter in a glass cutting machine, the combination of a support, an oscillating shaft pivotally mounted on said support, a crank rod, a projection and a shoe each rigidly connected with said shaft, a cutter carrier pivoted to said support and resting freely on said crank rod, a frame, said support and said frame being capable of reciprocating motion relatively to each other, ramps on said frame cooperating with said shoe to rotate said shaft and raise said crank rod, a latch cooperating with said projection to hold said crank in raised position, said latch having a depending heel portion, and an adjustable stop on said frame cooperating with said heel portion to move said latch away from said projection, a spring being interposed between said stop and said frame to allow said stop to move back a distance and to move the latch out of the way of said projection when said shoe is in contact with and rising on the ramp cooperating with said shoe at the end of the return stroke of the support and causes the disengagement of said projection from said latch, said ramps being provided at each end of the path of said reciprocating motion, and a supplementary ramp intermediate the ends of said path, said supplementary ramp being sufficiently high to engage said shoe and cause it to lift said cutter carrier but not high enough to cause said shoe to move said projection into engagement with said latch.

EDGARD BRICHARD.
MARC DELACUVELLERIE.
PIERRE MALICHEFF.

REFERENCES CITED

The following references are of record in the file of this patent:

UNITED STATES PATENTS

| Number | Name | Date |
| --- | --- | --- |
| 477,585 | Wilson | June 21, 1892 |
| 1,461,002 | Hope | July 3, 1923 |
| 1,702,522 | Owen | Feb. 19, 1929 |
| 1,852,310 | Klages et al. | Apr. 5, 1932 |
| 2,356,877 | Oakes | Aug. 29, 1944 |